UNITED STATES PATENT OFFICE 2,653,943

PYRAN DERIVATIVES AND PROCESS FOR THE MANUFACTURE THEREOF

Fritz Kögl, Utrecht, and Cornelis A. Salemink, Amersfoort, Netherlands, assignors to Hoffmann-La Roche Inc., Nutley, N. J., a corporation of New Jersey No Drawing. Application February 28, 1951, Serial No. 213,302. In Switzerland March 6, 1950

1 Claim. (Cl. 260—343.5)

The present invention relates to a process for the manufacture of compounds of the general formula

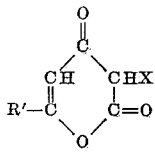

wherein

R' represents a straight- or a branched-chained alkyl or alkenyl radical,

X represents hydrogen or the radical —COR", wherein R" stands for an alkyl or alkenyl radical different from that represented by R'.

As disclosed in our copending application, Ser. No. 208,656, filed January 30, 1951, pyran derivatives of the general formula

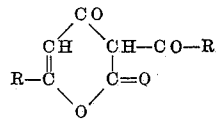

wherein

R represents an alkyl radical with 3 to 5 C-atoms, can be obtained by heating to 200–220° C. homologous acetoacetic esters of the formula

wherein

R has the above indicated meaning and R' represents any lower alkyl radical, in the presence of a catalyst of basic reaction, particularly sodium bicarbonate, and distilling off the alcohol formed during the reaction process. It has now been found that also such pyran derivatives, the 3-position of which is unsubstituted, or the acyl substituent in position 3 of which has an alkyl radical different from the substituent in position 6, likewise possess excellent fermentation-inhibiting or bactericidal properties.

The present invention thus first relates to the manufacture of compounds of the general formula

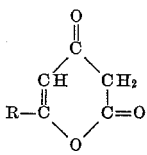

wherein

R represents a straight- or a branched-chained alkyl or alkenyl radical with more than one C-atom, comprising heating, to about 130° C., a compound of the general formula

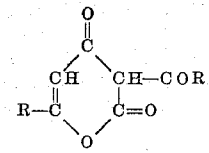

in sulphuric acid, preferably of 90 per cent. (by weight). The starting materials for the process in question can be obtained in accordance with the methods described in our copending application Ser. No. 208,656, filed January 30, 1951.

A further object of the present invention consists in preparing compounds of the general formula

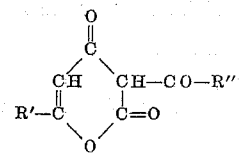

wherein

R' and R" represent straight- or branched-chained alkyl or alkenyl radicals differing from one another, comprising reacting, at a temperature of 160–180° C., compounds of the general formula

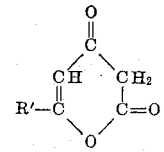

in pyridine with acid anhydrides of the general formula

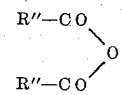

The novel compounds obtained according to the present invention inhibit the growth of micro-organisms, and, even when diluted to a considerable extent, they are able to inhibit fermentation of fruit juices, preserves and other such articles; the products are useful as means for preservation.

*Example 1*

5 parts by weight of one of the dehydro-acetic acid homologs, as cited below, are heated to 130° C., for 8 minutes in an oil bath, with 15 parts by weight of 90 per cent. (by weight) of sulphuric acid. The reaction mixture is poured on ice, whereby the oil which separates quickly solidifies in crystals. By recrystallisation from water colourless crystals are obtained. Thus, the following compounds are obtained:

(a) By starting out from 3-propionyl-6-ethyl-2,3-dihydropyran-2,4-dione: 6-ethyl-2,3-dihydropyran-2,4-dione, consisting of colourless crystals of melting point 103.5° C.

(b) From 3-butyral-6-propyl-2,3-dihydropyran-2,4-dione: 6-propyl-2,3-dihydropyran-2,4-dione, consisting of colourless needles of melting point 94–95° C.

(c) From 3-isobutyral-6-isopropyl-2,3-dihydropyran-2,4-dione: 6-isopropyl-2,3-dihydropyran-2,4-dione, consisting of colourless flakes of melting point 86° C.

(d) From 3-valeryl-6-butyl-2,3-dihydropyran-2,4-dione: 6-butyl-2,3-dihydropyran-2,4-dione, consisting of small colourless needles of melting point 58.5° C.

(e) From 3-isovaleryl-6-β-methylpropyl-2,3-dihydropyran-2,4-dione: 6-β-methylproypl-2,3-dihydropyran-2,4-dione, consisting of colourless crystals of melting point 106–107° C.

(f) From 3-caproyl-6-pentyl-2,3-dihydropyran-2,4-dione: 6-pentyl-2,3-dihydropyran-2,4-dihydropyran-2,4-dione, consisting of colourless needles of melting point 47–48° C.

(g) From 3-heptoyl-6-hexyl-2,3-dihydropyran-2,4-dione: 6-hexyl-2,3-dihydropyran-2,4-dione, consisting of colourless needles of melting point 47–48° C.

Example 2

2 parts by weight of triacetic acid lactone are heated, to 163° C., for 2 hours in an oil bath, with 10 parts by volume of propionic acid anhydride and 0.5 part by volume of dry pyridine. By fractionated distillation in vacuo under a pressure of 12 mm. Hg, the fraction passing over at 140–150° C. is collected. It consists of an oil which quickly solidifies in the cold. By recrystallisation from absolute alcohol, 3-propionyl-6-methyl-2,3-dihydropyran-2,4-dione is obtained in the form of small needles of melting point 101–102° C.

Example 3

1.5 parts by weight of triacetic acid lactone are heated to 170–180° C., for 2 hours in an oil bath, with 7 parts by volume of butyric acid anhydride and 0.5 part by volume of absolute pyridine. The further working up is effected as described in Example 2 above. The fraction distilling over under a pressure of 12 mm. Hg at 160–170° C. recrystallises from alcohol in needles of melting point 57–58° C. and consists of 3-butyryl-6-methyl-2,3-dihydropyran-2,4-dione.

The following compounds can be obtained in analogous manner:

(a) Starting out from triacetic acid lactone and isobutyric acid anhydride: 3-isobutyryl-6-methyl-2,3-dihydropyran-2,4-dione, consisting of an oil of boiling point 12 mm. Hg 165–170° C.

(b) From triacetic acid lactone and valeric acid anhydride: 3-valeryl-6-methyl-2,3-dihydropyran-2,4-dione, consisting of needles of melting point 73–74° C.

(c) From 6-ethyl-2,3-dihydropyran-2,4-dione and isobutyric acid anhydride: 3-isobutyryl-6-ethyl-2,3-dihydropyran-2,4-dione, consisting of an oil of boiling point 12 mm. Hg 164–170° C.

(d) From 6-ethyl-2,3-dihydropyran-2,4-dione and valeric acid anhydride: 3-valeryl-6-ethyl-2,3-dihydropyran-2,4-dione, consisting of an oil of boiling point 12 mm. Hg 174–178° C.

(e) From 6-propyl-2,3-dihydropyran-2,4-dione and acetic anhydride: 3-acetyl-6-propyl-2,3-dihydropyran-2,4-dione, consisting of an oil of boiling point 12 mm. Hg 160° C.

(f) From 6-propyl-2,3-dihydropyran-2,4-dione and propionic acid anhydride: 3-propionyl-6-propyl-2,3-dihydropyran-2,4-dione, consisting of needles of melting point 49–50° C.

(g) From 6-propyl-2,3-dihydropyran-2,4-dione and isobutyric acid anhydride: 3-isobutyryl-6-propyl-2,3-dihydropyran-2,4-dione, consisting of an oil of boiling point 12 mm. Hg 178° C.

(h) From 6-propyl-2,3-dihydropyran-2,4-dione and valeric acid anhydride: 3-valeryl-6-propyl-2,3-dihydropyran-2,4-dione, consisting of an oil of boiling point 12 mm. Hg 185–187° C.

(i) From 6-isopropyl-2,3-dihydropyran-2,4-dione and butyric acid anhydride: 3-butyryl-6-isopropyl-2,3-dihydropyran-2,4-dione, consisting of needles of melting point 50° C.

(k) From 6-butyl-2,3-dihydropyran-2,4-dione and propionic acid anhydride: 3-propionyl-6-butyl-2,3-dihydropyran-2,4-dione, consisting of needles of melting point 38° C.

We claim:

A process of making 3-valeryl-6-ethyl-2,3-dihydropyran-2,4-dione which comprises reacting 6-ethyl-2,3-dihydropyran-2,4-dione with valeric acid anhydride at a temperature of 160–180° C.

FRITZ KÖGL.
CORNELIS A. SALEMINK.

References Cited in the file of this patent

UNITED STATES PATENTS

| Number | Name | Date |
|---|---|---|
| 2,454,742 | Morgan | Nov. 23, 1948 |
| 2,542,849 | Von Glahn | Feb. 20, 1951 |

FOREIGN PATENTS

| Number | Country | Date |
|---|---|---|
| 192,081 | Switzerland | Dec. 16, 1937 |

OTHER REFERENCES

Feist Ann., 257 at 253 (1890).
Arndt and Nachtweg: Berichte, 57, 1489 (1924).
Arndt et al.: Berichte, 69, 2373 (1936).
v. Pechmann: Berichte, 24, 3600 (1891). Liebigs Ann. 273, 194 (1893).
Collie: J. Chem. Soc., 59 607, 617 (1891).
Schottle et al.: Berichte, 45, 3230 (1912).
Deschapande: J. Indian Chem. Soc., 9, 303 (1932).